United States Patent
Cardone et al.

(10) Patent No.: US 9,813,904 B2
(45) Date of Patent: Nov. 7, 2017

(54) SYSTEM AND METHOD OF SECURE LOGON FOR SHARED DEVICES

(71) Applicant: Dell Products, LP, Round Rock, TX (US)

(72) Inventors: Richard J. Cardone, Austin, TX (US); Muhammad Yousaf, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 543 days.

(21) Appl. No.: 14/014,662

(22) Filed: Aug. 30, 2013

(65) Prior Publication Data

US 2015/0067775 A1 Mar. 5, 2015

(51) Int. Cl.
*G06K 9/00* (2006.01)
*H04W 12/06* (2009.01)
*H04L 29/06* (2006.01)

(52) U.S. Cl.
CPC ......... *H04W 12/06* (2013.01); *H04L 63/0884* (2013.01); *H04L 63/0861* (2013.01)

(58) Field of Classification Search
CPC ........ G06F 1/3231; G06F 21/32; G06F 21/35; G06F 21/83; G06F 21/31; G06F 2221/2139; G06F 2221/2137; G06K 9/00013
USPC .................................................. 726/2, 3, 26
See application file for complete search history.

(56) References Cited

U.S. PATENT DOCUMENTS

| | | | | |
|---|---|---|---|---|
| 5,229,764 A | * | 7/1993 | Matchett et al. | 340/5.52 |
| 5,757,916 A | * | 5/1998 | MacDoran et al. | 380/258 |
| 5,787,186 A | * | 7/1998 | Schroeder | 382/115 |
| 6,338,138 B1 | | 1/2002 | Raduchel et al. | |
| 6,694,346 B1 | | 2/2004 | Aman et al. | |
| 7,962,738 B2 | | 6/2011 | Zimmer et al. | |
| 8,396,452 B1 | * | 3/2013 | Matsuoka | 455/410 |
| 8,453,207 B1 | * | 5/2013 | White et al. | 726/2 |
| 8,583,908 B2 | * | 11/2013 | Zimmer | G06F 9/4401 713/1 |
| 8,595,810 B1 | * | 11/2013 | Ben Ayed | 726/8 |
| 8,850,573 B1 | * | 9/2014 | Chen et al. | 726/22 |

(Continued)

OTHER PUBLICATIONS

Boehm, "SAFE: Secure Authentication with Face and Eyes", 2013 International Conference on Privacy and Security in Mobile Systems (PRISMS), Jun. 24-27, 2013, 8 pages.*

(Continued)

*Primary Examiner* — James Turchen
*Assistant Examiner* — Walter Malinowski
(74) *Attorney, Agent, or Firm* — Larson Newman, LLP

(57) ABSTRACT

A system includes a sensor to determine a user is proximate to the system and a logon module to receive information from the sensor that a user is proximate to the system, receive logon information from the user and identification information associated with the user, authenticate the user to use the system based on the logon information, store the identification information, receive second information from the sensor that the user is not proximate to the system, suspend an operating system session, receive information from the sensor that the user is again proximate to the system, receive second identification information associated with the user, determine that the first and second identification information matches, and resume the OS session in response to determining that the first and second identification information matches.

20 Claims, 5 Drawing Sheets

(56) References Cited

U.S. PATENT DOCUMENTS

| | | | |
|---|---|---|---|
| 2002/0099562 A1* | 7/2002 | Bruce et al. | 705/1 |
| 2003/0158927 A1* | 8/2003 | Sagey et al. | 709/223 |
| 2005/0050339 A1* | 3/2005 | Himmel | G06F 21/32 713/189 |
| 2006/0169771 A1* | 8/2006 | Brookner | 235/382 |
| 2006/0224878 A1* | 10/2006 | Datta | H04L 9/32 713/2 |
| 2006/0288234 A1* | 12/2006 | Azar | G06F 21/32 713/186 |
| 2007/0057763 A1* | 3/2007 | Blattner et al. | 340/5.52 |
| 2008/0109895 A1* | 5/2008 | Janevski | 726/19 |
| 2008/0113785 A1* | 5/2008 | Alderucci et al. | 463/29 |
| 2008/0173717 A1* | 7/2008 | Antebi et al. | 235/439 |
| 2009/0076891 A1* | 3/2009 | Cardone et al. | 705/12 |
| 2009/0119087 A1 | 5/2009 | Ang et al. | |
| 2009/0172378 A1 | 7/2009 | Kazmierczak et al. | |
| 2009/0193496 A1 | 7/2009 | Lakshminarayanan et al. | |
| 2009/0313224 A1* | 12/2009 | Fields et al. | 707/3 |
| 2009/0319782 A1* | 12/2009 | Lee | 713/156 |
| 2010/0050245 A1* | 2/2010 | Samatov | 726/8 |
| 2010/0212001 A1* | 8/2010 | Kashyap et al. | 726/7 |
| 2011/0010216 A1* | 1/2011 | Bhogal et al. | 705/8 |
| 2011/0219105 A1* | 9/2011 | Kryze et al. | 709/223 |
| 2012/0030752 A1* | 2/2012 | Bruno et al. | 726/16 |
| 2012/0254984 A1* | 10/2012 | Levien et al. | 726/16 |
| 2012/0328190 A1* | 12/2012 | Bercovich et al. | 382/165 |
| 2013/0135115 A1* | 5/2013 | Johnson et al. | 340/870.02 |
| 2013/0227651 A1* | 8/2013 | Schultz et al. | 726/4 |
| 2013/0229333 A1* | 9/2013 | Schwartz et al. | 345/156 |
| 2014/0015930 A1* | 1/2014 | Sengupta | 348/46 |
| 2014/0075178 A1* | 3/2014 | Trethewey | 713/100 |
| 2014/0316984 A1* | 10/2014 | Schwartz | 705/44 |
| 2014/0379801 A1* | 12/2014 | Gupta | 709/204 |

OTHER PUBLICATIONS

Ricci, "SecurePhone: a mobile phone with biometric authentication and e-signature support for dealing secure transactions on the fly", Mobile Multimedia/ Image Processing for Military and Security Applications, May 2, 2006, 11 pages.*

Kurkovsky, "Approaches and Issues in Location-Aware Continuous Authentication", 2010 13th IEEE International Conference on Computational Science and Engineering, 5 pages.*

Dwivedi, "Defending against Attacks by Enhancing Security using Biometrics in Semantic Web", 2011 Journal of Global Research in Computer Science, pp. 17-28.*

"Watchport Vision Series", Digi, 2007, 4 pages.*

Xiao, "Facial Recognition in Uncontrolled Conditions for Information Security", Hindawi Publishing Corporation, EURASIP Journal on Signal Processing, vol. 2010, 9 pages.*

Rice, "Access to, Usage of, and Outcomes from an Electronic Messaging System", ACM Transactions on Office Information Systems, vol. 6, No. 3, Jul. 1988, pp. 255-276.*

Anwar, "Plethora: A Framework for Converting Generic Applications to Run in a Ubiquitous Environment", Proceedings of the Second Annual International Conference on Mobile and Ubiquitous Systems,: Networking and Services (MobiQuitous'05), 2005, 10 pages.*

"Proximity Based Presence", IPCOM000136547, May 22, 2006, 2 pages.*

* cited by examiner

US 9,813,904 B2

SYSTEM AND METHOD OF SECURE LOGON FOR SHARED DEVICES

FIELD OF THE DISCLOSURE

This disclosure relates generally information handling systems, and more particularly relates to secure logon for devices shared by multiple users.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, data storage systems, and networking systems. A group of users can have access to a single information handling system and each user can need to logon to the information handling system, or a particular user can have access to multiple information handling systems and need to logon to each information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Figure 1:
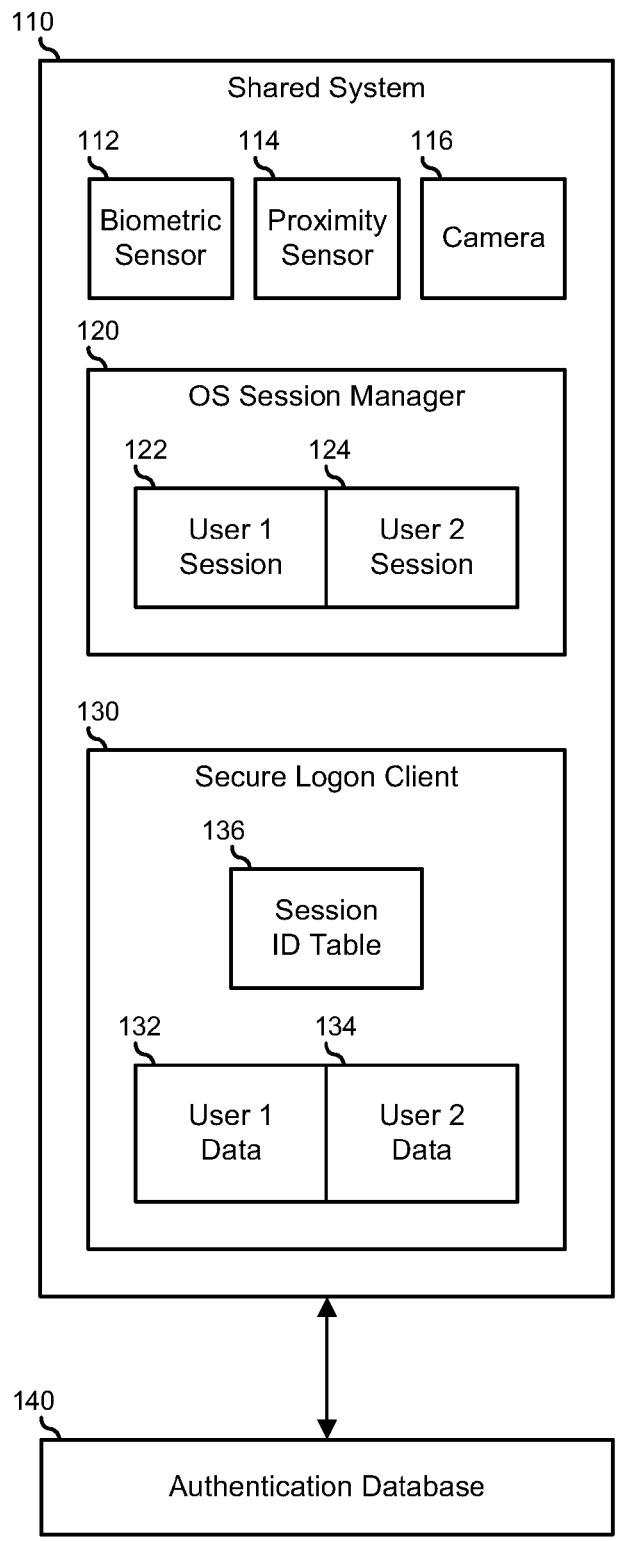
FIG. 1 is a block diagram illustrating a shared system that supports multiple users according to an embodiment of the present disclosure.

FIG. 1 illustrates a shared system 110, an embodiment of an information handling system that supports multiple users and that includes a biometric sensor 112, a proximity sensor 114, a camera device 116, a session managed operating system (OS) 120 and a secure logon client 130. Shared system 110 is connected to an authentication database 140. OS session manager 120 operates to manage user environments on shared system 110. As such, OS session manager 120 includes a user session 122 and one or more additional user sessions 124. In a particular embodiment, OS session manager 120 represents an OS that enables multiple users to be logged onto shared system 110 at the same time, thereby creating a unique user session 122 and 124 for each user that is logged onto shared system 110. An example of a multi-user OS includes a Linux OS, a Unix OS, a Remote Desktop Connection enabled Windows Server OS, or another multi-user OS, as needed or desired. In another embodiment, OS session manager 120 represents a virtual machine operating environment where each user is allocated the resources of a unique virtual machine that is associated with user sessions 122 and 124. An example of a virtual machine operating environment includes VMware, Xen, Hyper-V, or another virtual machine manager. In a particular embodiment, OS session manager 120 represents a combination of multiple user enabled OSs and a virtual machine operating environment, such that one or more of the virtual machines implements a multiple user enabled OS, and such that one or more users is associated with a particular virtual machine instantiation. Thus, as used herein, the term "session" refers to an association between a particular user and an operating environment allocated to the use of that user on a particular device or group of networked devices. In a particular embodiment, a session is limited as to the duration that the session remains open. For example, user session 122 can be opened when a user associated with user data 132 logs on at the beginning of a work shift, and the session can have a default session duration of 8 hours to cover a work shift, of 4 hours to cover a portion of a work shift before or after a break, or of some other time limit, as needed or desired. In another example, user session 124 can be closed when a user associated with user data 134 logs off of shared system 110.

Secure logon client 130 includes user authentication data 132 for a particular user, user authentication data 134 for one or more additional users, and a session identification table 136. Secure logon client 130 operates to receive logon credentials from users of shared system 110, to authenticate the logon credentials against known authorized users of the shared system, and, upon authenticating a particular user, to direct OS session manager 120 to establish a user session 122 or 124 that is allocated to the authenticated user. In a particular embodiment, a user provides single-factor logon credentials to secure logon client 130 by use of biometric sensor 112. Here, shared system 110 provides a prompt to the user to provide the logon credentials, the user provides a scan of a particular biometric aspect of their person, and secure logon client 130 compares data from the scan with the associated user data 132 or 134 to authenticate that user onto the shared system. In a particular embodiment, secure logon client 130 authenticates the user onto shared system 110 by comparing the data from the scan with information from authentication database 140. An example of a biometric scan that can be provided to biometric sensor 112 includes a finger print scan, a retinal scan, a voice scan, a scan associated with another biometric aspect, or a combination thereof. In another embodiment, a user provides other single-factor logon credentials to secure logon client 130 by use of a keyboard or a key pad. Here, shared system 110 provides a prompt to the user to provide the logon credentials, the user types in the login credentials, and secure logon client 130 compares data with the associated user data 132 or 134 to authenticate that user onto the shared system. In a particular embodiment, secure logon client 130 authenticates the user onto shared system 110 by comparing the logon credentials with information from authentication database 140. An example of typed logon credentials includes a username/password combination, a personal identification number (PIN), another type of login credential, or a combination thereof. In yet another embodiment, a user provides secure device logon credentials to secure logon client 130. Here, shared system 110 detects the presence of a secure device, such as a Smart Card, a Near Field Communication (NFC) device, a Smart Phone with an associated logon application, a Radio Frequency Identification (RFID) tag, or another secure device and secure logon client 130 compares data from the secure device with the associated user data 132 or 134 to authenticate that user onto the shared system. In a particular embodiment, secure logon client 130 authenticates the user onto shared system 110 by comparing the secure device logon credentials with information from authentication database 140. In another embodiment, a user provides multi-factor logon credentials to secure logon client 130 that includes a combination of single-factor logon credentials and secure device logon credentials. In a particular embodiment, a secure device includes a device that is registered with shared device logon system and that meets a security standard associated with the shared device logon system.

In a particular embodiment, shared system 110 operates to provide a full credential logon and an expedited credential logon. In a full credential logon, a user provides single-factor logon credentials or multi-factor logon credentials, and secure logon client 130 authenticates the provided logon credentials based upon user data 132 or user data 134, or based upon information from authentication database 140. If the provided logon credentials are authenticated as being received from a user associated with user data 132 or user data 134, then secure logon client 130 initiates a session for the user by writing session identifying information into session identification table 136 and directs OS session manager 120 to establish an associated user session 122 or 124. In a particular embodiment, secure logon client 130 directs camera device 116 to take a photograph of the user and uses that photograph in the authentication process. In a particular embodiment, secure logon client 130 authenticates the user onto shared system 110 by comparing the photograph with information from authentication database 140. Secure logon client 130 stores the data from the photographic comparison in the associated user data 132 or user data 134 for later use in an expedited credential logon, as described below. In this embodiment, user session 122 or 124 that is opened in response to the logon credentials can remain open until proximity sensor 114 or camera device 116 detects that the user is no longer present at shared system 110. In a variation on this embodiment, user session 122 or 124 remains open for a particular duration before closing the user session. For example, secure logon client can maintain user session 122 or 124 if proximity sensor 114 or camera device 116 detects that the user is not present at shared system 110 for longer than a preset duration, such as one minute, five minutes, or another duration, as needed or desired. In another embodiment, when proximity sensor 114 or camera device 116 detects that a user associated with user session 122 or 124 is no longer present at shared system 110, the user session remains open, but is placed into a suspended state, thereby permitting another user to logon to the shared system, or to otherwise free up processing resources of the shared system. In a particular embodiment, when user session 122 or 124 is suspended, secure logon client 130 notes that the user session is suspended in the entry for the session in session identification table 136. In a particular embodiment, secure logon client 130 also compares the data from the photograph with a user account during user registration, as described below.

In an expedited credential logon, one or more of user sessions 122 or 124 have been previously opened, but have been suspended based upon one or more of proximity sensor 114 or camera device 116 detecting that the user is no longer present at shared system 110. Then, as some later time, a user with a suspended user session 122 or 124 is detected by one or more of proximity sensor 114 or camera device 116 to have returned to shared system 110. Here, secure logon client 130 receives information associated with user data 132 or user data 134, and directs OS session manager 120 to resume the associated user session 122 or 124. For example, a user with a Smart Card, or an NFC device can return to shared system 110 and proximity sensor 114 can provide the information from the secure device to secure logon client 130. Secure logon client 130 can then determine that the provided information is associated with a suspended session in session ID table 136, and can direct OS session manager to resume the suspended user session 122 or 124. In another example, when a user returns to shared system 110, camera device 116 can take a picture of the user and provide the picture information to secure logon client 130. Secure logon client 130 can then determine that the provided camera device information is associated with a suspended session in session ID table 136, for example, through the use of facial recognition software, and can direct OS session manager to resume the suspended user session 122 or 124. Thus expedited credential logon permits a user of shared system 110 to quickly resume using the shared system without having to completely log the user off the shared system every time the user leaves the proximity of the shared system, and without having to perform a full credential logon every time the user returns to the shared system.

In a particular embodiment, before either a full credential logon or an expedited credential logon, shared system 110 operates to detect the presence of a user via one or more of proximity sensor 114 or camera device 116, and shared system 110 operates to prepare for a full credential logon or an expedited credential logon based upon the detected presence of the user.

In another embodiment, shared system 110 operates to detect the presence of two or more users at the same time. Here, for example, proximity sensor 114 can detect two or more secure devices, the facial recognition software can detect the images of two or more users, or a combination thereof. In this embodiment, shared system 110 displays a message that two or more users are detected and that one of the users needs to be selected for authentication and user session 122 or 124 resumption. For example, shared system 110 can provide a prompt for a user to be selected, such as by selecting from a list, by a user entering a pre-assigned hot key or PIN, or by another method of selection. In another embodiment, shared system 110 displays a list of the detected users that are in the proximity of shared system 110, and an indication is provided for each detected user as to whether a full credential logon or an expedited credential logon is needed for that user to access the shared system.

Authentication database 140 represents a repository for the creation and storage of authentication credentials. As such, when a new user is associated with shared system 110, the user proceeds through a registration procedure were authentication information for the user is originally created and stored. For example, a user can be given a username/password pair, biometric data can be gathered, such as a finger print scan, a retinal scan, a voice sample, or the like, facial recognition information such as a facial photograph can be taken, and the user can be provided with a secure authentication device. In a particular embodiment, authentication database 140 is updated after the initial creation and is accessed during user logon. The database can exist as part of the Shared System (110) or external to the Shared System and attached via a network. In a particular embodiment, authentication database 140 is accessible to shared system 110 via a network connection. In another embodiment, authentication database 140 is included in secure logon client 130.

Figure 2:
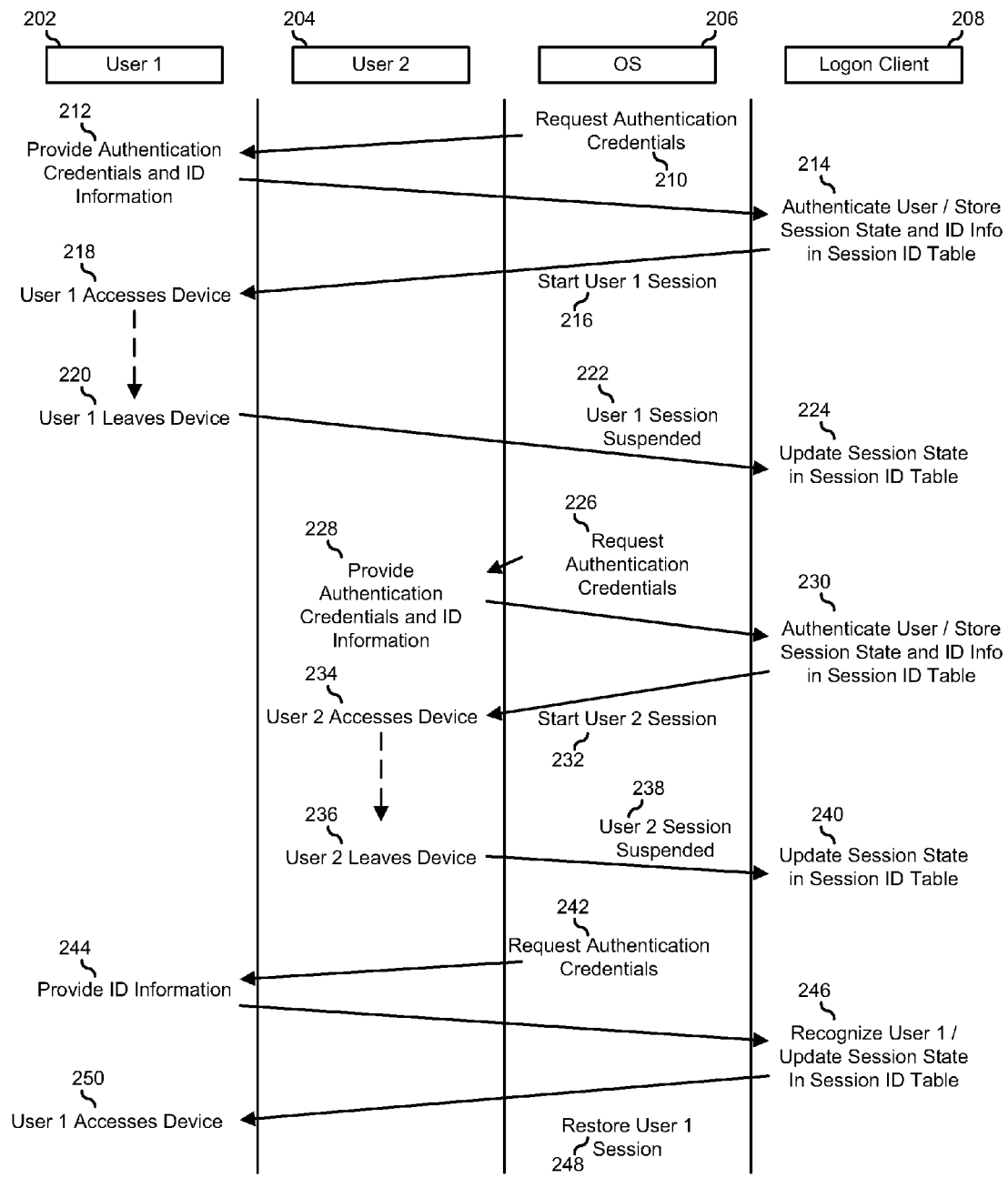
FIG. 2 is a flow graph illustrating multiple users logging on to a shared system similar to the shared system of FIG. 1.

FIG. 2 is a flow graph 200 illustrating multiple users logging on to a shared system 200 similar to shared system 110. Shared system 200 includes multiple users 202 and 204, an OS 206 similar to managed session OS 120, and a logon client 208 similar to secure logon client 130. The method starts a full credential logon process for user 202 with OS 206 displaying a request for authentication credentials 210. In a particular embodiment, request for authentication credentials 210 includes a dialog request for a username and a password. In a particular embodiment, other information is requested by OS 206 in request for authentication credentials 210. For example, request for authentication credentials 210 can include a list of users that are detected to be in the proximity of the shared system and can request for a selection of one of the proximate users. In another embodiment, request for authentication credentials 210 is provided in response to a hot key sequence being entered by a user. In another embodiment, request for authentication credentials 210 is optional based, and logon credentials are not provided in response to a dialog, but are provided based upon the detection of a secure device.

User 202 provides their authentication credentials 212 including identifying information. In a particular embodiment, user 202 provides authentication credentials 212 while in front of a camera device of the shared system, and the shared system takes a photograph of the user. In another embodiment, the shared system does not take a photograph of user 202, but instead recognizes the user based upon the detection of a secure device. Logon client 208 receives the authentication credentials 212 and authenticates the user 214. If user 202 is authenticated, logon client 208 opens a session for the user, stores an entry in a session identifier table and stores the identification information associated with the user. Logon client 208 then directs OS 206 to start a user session 216 associated with user 202 and the user accesses the device 218. At a later time, user 202 leaves the shared system 220, OS 206 suspends 222 the user's session, and logon client 208 updates the entry 224 associated with the user in the session identifier table.

After user 202 leaves the shared system 220, a full credential logon process for user 204 starts when OS 206 displays a request for authentication credentials 226, similar to request for authentication credentials 212. User 204 provides their authentication credentials 228 including identifying information. Logon client 208 receives the authentication credentials 228 and authenticates the user 230. If user 204 is authenticated, logon client 208 opens a session for the user, stores an entry in a session identifier table and stores the identification information associated with the user. Logon client 208 then directs OS 206 to start a user session 232 associated with user 204 and the user accesses the device 234. At a later time, user 204 leaves the shared system 236, OS 206 suspends 238 the user's session, and logon client 208 updates the entry 240 associated with the user in the session identifier table.

An expedited credential logon process for user 202 starts when OS 206 displays a request for authentication credentials 242, similar to request for authentication credentials 212 and 226. Here, instead of providing authentication credentials, as described in the full credential logon described above, user 202 provides identifying information 244 to the shared system. In a particular embodiment, the identifying information is captured as a photograph from a camera device. In another embodiment, the identifying information is based upon the presence of a secure device. Logon client 208 receives identifying information 244 and recognizes the user 246. If user 202 is recognized, logon client 208 updates the entry 246 in the session identifier table to reopen the user's session, and directs OS 206 to restore the user session 248 associated with user 202 and the user accesses the device 250.

The skilled artisan will recognize that the illustration of users 202 and 204 are exemplary, and that more users can be similarly accommodated. Further, the authentication of user 204 is not necessary to the intent of the illustration, in that the return of user 202 prior to any other user being authenticated is not precluded by the present illustration. Moreover, an intervening logon of a second user can be a full credential logon, as illustrated, or an expedited credential logon, as needed or desired.

Figure 3:
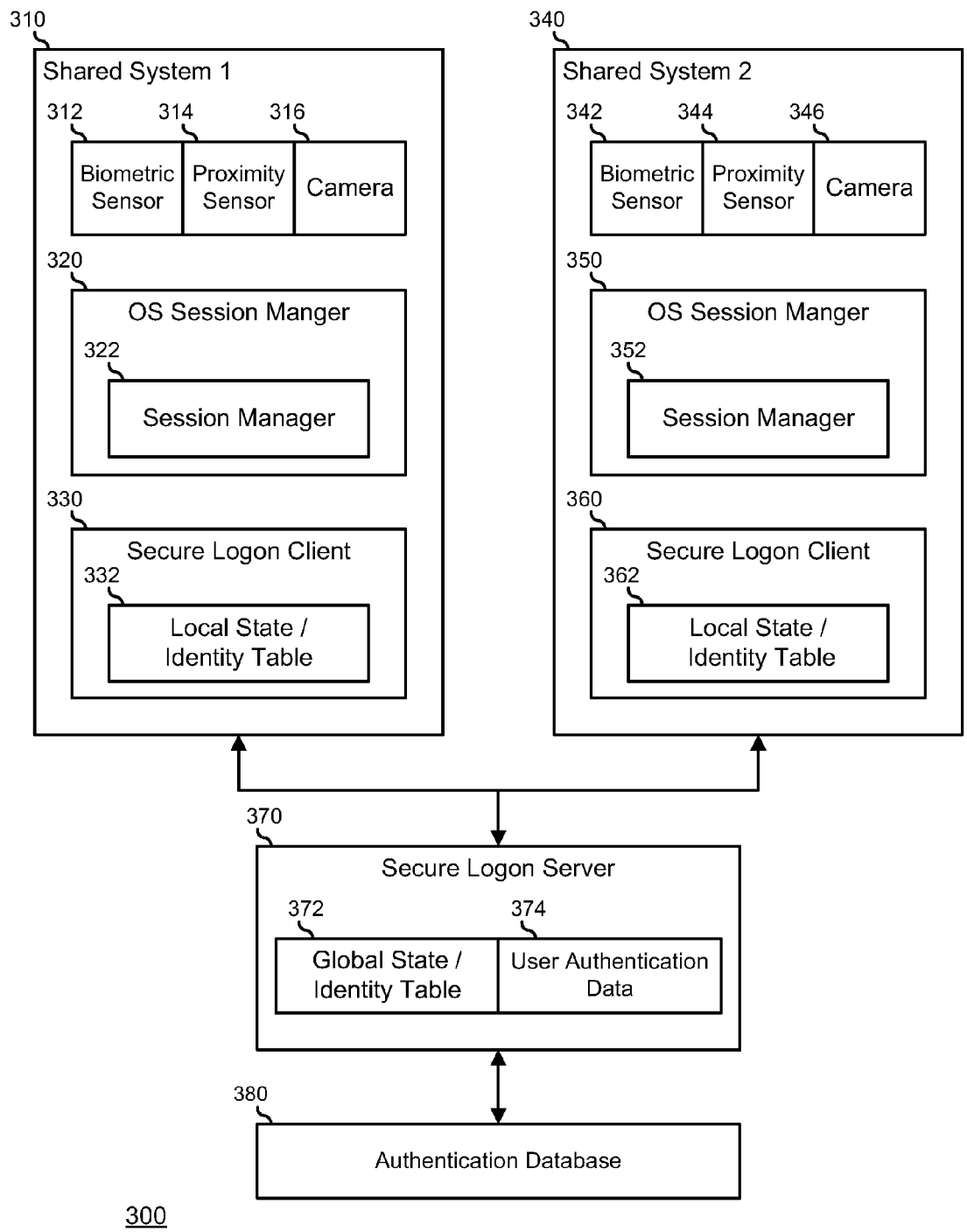
FIG. 3 is a block diagram illustrating a shared network of shared systems that support a common user according to an embodiment of the present disclosure.

FIG. 3 illustrates a shared network 300 that supports a common user and that includes a shared system 310, one or more additional shared systems 340, a secure logon server 370, and an authentication database 380 similar to authentication database 140. An example of secure logon server 370 includes Kerberos, Windows Network Domains/Active Directory, or another secure logon system, as needed or desired. Shared systems 310 and 340 are similar to shared system 110. As such, shared system 310 includes a biometric sensor 312, a proximity sensor 314, a camera device 316, an OS session manager 320 and a secure logon client 330, and shared system 340 includes a biometric sensor 342, a proximity sensor 344, a camera device 346, an OS session manager 350 and a secure logon client 360. OS session managers 320 and 350 operate to manage user environments on respective shared systems 310 and 340. OS session manager 320 includes a session manager 322 and OS session manager 350 includes a session manager 352. In a particular embodiment, one or more of OS session managers 320 and 350 represent OSs that enable multiple users to be logged onto respective shared systems 310 and 340 at the same time. In another embodiment, one or more of OS session managers 320 and 350 represent virtual machine operating environments where each user is allocated the resources of a unique virtual machine. Secure logon client 330 includes a local state and identity table 332 and secure logon client 360 includes a local state and identity table 362. In a particular embodiment, shared systems 310 and 340 operate to permit multiple users to perform full credential logon and expedited credential logon as described above.

Secure logon server 370 includes a global state and identity table 372 and user authentication data 374 for a user of shared network 300. In a particular embodiment, secure logon server 370 includes user authentication data for one or more additional users of shared network 300. Global state and identity table 372 is similar to session identification table 136. Shared network 300 operates to receive logon credentials from users of the shared network, to authenticate the logon credentials against known authorized users of the shared network, and, upon authenticating a particular user, to direct one or more of OS session managers 320 and 350 to establish a user session that is allocated to the authenticated user. In a particular embodiment, a user provides single-factor logon credentials to one or more of secure logon clients 330 and 360 by use of the respective biometric sensor 312 or 342. In another embodiment, a user provides other single-factor logon credentials to one or more of secure logon clients 330 and 360 by use of a keyboard or a key pad. In yet another embodiment, a user provides secure device logon credentials to one or more of secure logon clients 330 and 360. In another embodiment, a user provides multi-factor logon credentials to one or more of secure logon clients 330 and 360 that includes a combination of single-factor logon credentials and secure device logon credentials. In each embodiment, the secure logon client 330 or 360 compares the logon credential data with associated user data in the respective local state and identity table 332 or 362. If the logon credentials match a user of the respective shared system 310 or 340, the user is authenticated onto the shared system. If the logon credentials do not match a user of the respective shared system 310 or 340, the logon credentials are passed to secure logon server 370 to authenticate the user onto shared network 300.

In a particular embodiment, secure logon server 370 operates to provide full credential logon and a remote expedited credential logon to one of shared systems 310 or 340. In full credential logon, a user provides single-factor logon credentials or multi-factor logon credentials, and secure logon server 370 authenticates the provided logon credentials based upon user authentication data 374. If the provided logon credentials are authenticated as being received from a user associated with user authentication data 374, then secure logon server 370 initiates a session for the user by writing session identifying information into global state and identity table 372, sends the session identifying information to the appropriate secure logon client 330 or 360 for writing into the respective local state and identity table 332 or 362, and directs the appropriate OS session manager 320 or 350 to establish an associated user session. In a particular embodiment, secure logon server 370 directs the appropriate camera device 316 or 346 to take a photograph of the user and uses that photograph in the authentication process. The photograph is compared to the photographic data stored in the respective local state and identity table 332 or 362, in the global secure logon server 370, or in authentication database 380. Secure logon server 370 stores data from the photographic comparison for later use in an expedited credential logon on that shared device 310 or 340. Secure logon server 370 also stores data from the photographic comparison in user authentication data 374 for later use in a remote expedited credential logon on the other shared system 310 or 340, as described below. In this embodiment, the user session that is opened in response to the logon credentials can remain open until the respective proximity sensor 314 or 344, or the respective camera device 316 or 346 detects that the user is no longer present at the appropriate shared system 310 or 340. In a particular embodiment, the user session remains open for a particular duration before closing the user session, as described above. In another embodiment, when the respective proximity sensor 314 or 344, or the respective camera device 316 or 346 detects that a user associated with user session is no longer present at the shared system 310 or 340, the user session remains open, but is placed into a suspended state, as described above.

In a remote expedited credential logon a user session has been previously opened on one of the shared systems (e.g., shared system 310), and has been suspended on that shared system. Then, as some later time, the user is detected by one or more of the proximity sensor (e.g., proximity sensor 344) or the camera device (e.g., camera device 346) to have arrived at the other shared system (e.g., shared system 340). Here, secure logon server 370 receives information associated with user authentication data 374 from shared system 340, and directs OS session manager 350 to resume a user session for the user. Thus remote expedited credential logon permits a user of one shared system to quickly resume using the other shared system without having to completely log the user onto the remote shared system every time the user leaves the proximity of the first shared system, and without having to perform a full credential logon every time the user approaches the remote shared system.

Figure 4:
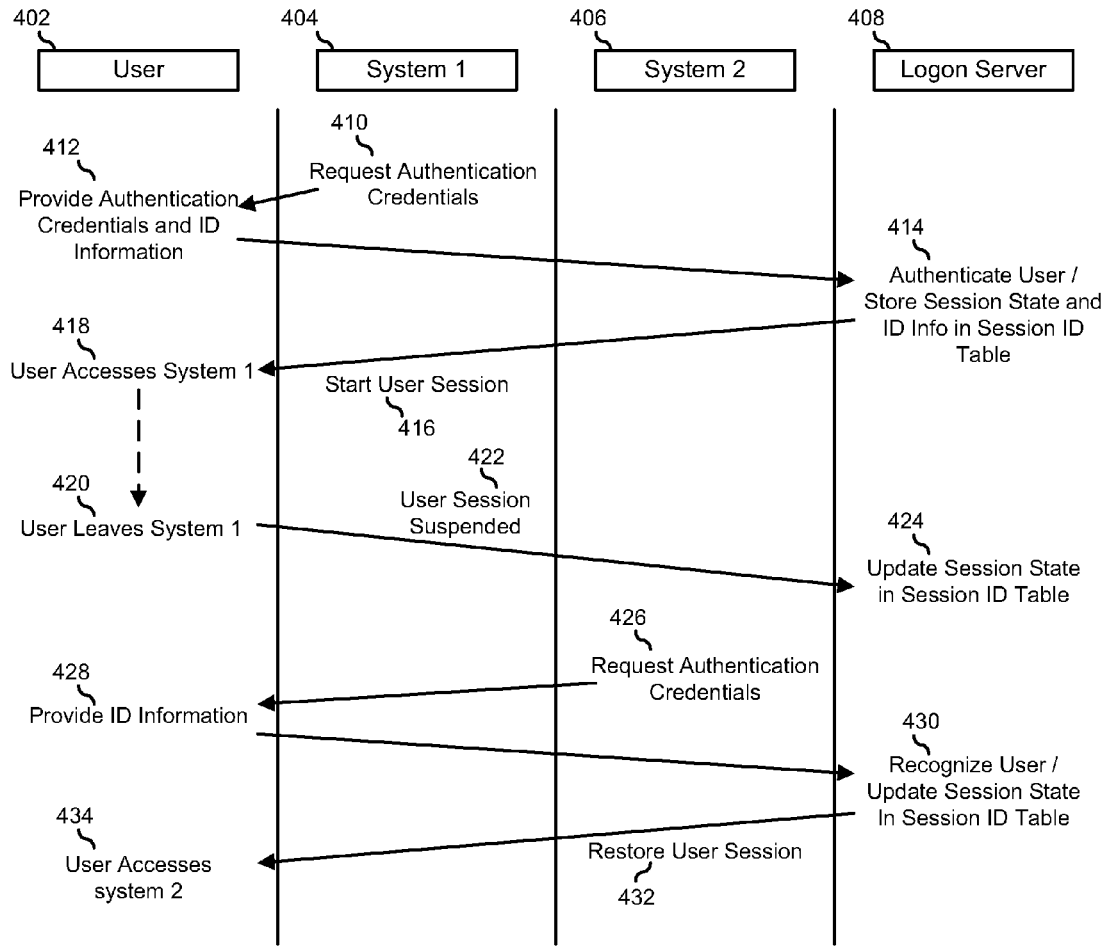
FIG. 4 is a flow graph illustrating a user logging on to a shared network similar to the shared network of FIG. 3.

FIG. 4 is a flow graph illustrating a user logging on to a shared network 400 similar to shared network 300. Shared network 400 includes a user 402, shared systems 404 and 406 similar to shared systems 310 and 340, and logon server 408 similar to secure logon server 370. The method starts a full credential logon process for user 402 with system 404 displaying a request for authentication credentials 410. User 402 provides their authentication credentials 412 including indentifying information. Logon server 408 receives the authentication credentials 412 and authenticates the user 414. If user 402 is authenticated, logon server 408 opens a session for the user, stores an entry in a global state and identity table and stores the identification information associated with the user. Logon server 408 then directs shared system 404 to start a user session 416 associated with user 402 and the user accesses the shared system 418. At a later time, user 402 leaves the shared system 420, the shared system 404 suspends 422 the user's session, and logon server 408 updates the entry 424 associated with the user in the global state and identity table.

After user 202 leaves the shared system 220, an expedited credential logon process for user 402 starts when shared system 406 displays a request for authentication credentials 426. Here, instead of providing authentication credentials, as described in the full credential logon described above, user 402 provides identifying information 428 to shared system 406. Logon server 408 receives identifying information 228 and recognizes the user 430. If user 402 is recognized, logon server 408 updates the entry in the global state and identity table to reopen the user's session, and directs shared system 406 to restore the user session 432 associated with user 402 and the user accesses the shared system 434.

Figure 5:
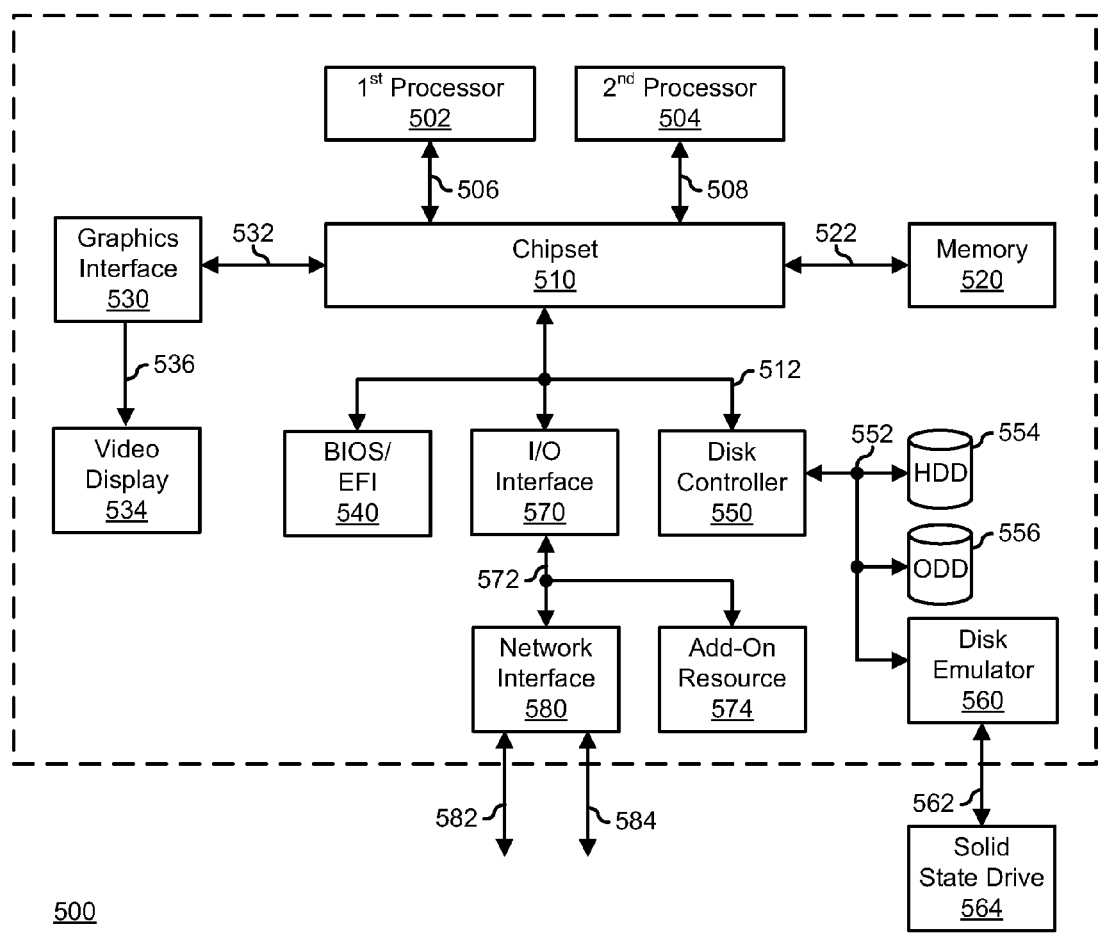
FIG. 5 is a block diagram illustrating a generalized information handling system according to an embodiment of the present disclosure.

FIG. 5 illustrates a generalized embodiment of information handling system 500. For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, shared system 110 can be a personal computer, a laptop computer, a smart phone, a tablet device or other consumer electronic device, a network server, a network storage device, a switch router or other network communication device, or any other suitable device and may vary in size, shape, performance, functionality, and price. Further, shared system 110 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described above, and operates to perform one or more of the methods described above. Information handling system 500 includes a processors 502 and 504, a chipset 510, a memory 520, a graphics interface 530, include a basic input and output system/extensible firmware interface (BIOS/EFI) module 540, a disk controller 550, a disk emulator 560, an input/output (I/O) interface 570, and a network interface 580. Processor 502 is connected to chipset 510 via processor interface 506, and processor 504 is connected to the chipset via processor interface 508. Memory 520 is connected to chipset 510 via a memory bus 522. Graphics interface 530 is connected to chipset 510 via a graphics interface 532, and provides a video display output 536 to a video display 534. In a particular embodiment, information handling system 500 includes separate memories that are dedicated to each of processors 502 and 504 via separate memory interfaces. An example of memory 520 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 540, disk controller 550, and I/O interface 570 are connected to chipset 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 540 includes BIOS/EFI code operable to detect resources within information handling system 500, to provide drivers for the resources, initialize the resources, and access the resources. BIOS/EFI module 540 includes code that operates to detect resources within information handling system 500, to provide drivers for the resources, to initialize the resources, and to access the resources.

Disk controller 550 includes a disk interface 552 that connects the disc controller to a hard disk drive (HDD) 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits a solid-state drive 564 to be coupled to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O interface 570 includes a peripheral interface 572 that connects the I/O interface to an add-on resource 574 and to network interface 580. Peripheral interface 572 can be the same type of interface as I/O channel 512, or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as chipset 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be coupled to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
    a first sensor configured to determine that a user is proximate to the information handling system;
    an authentication database comprising user authentication information; and
    a logon module configured to:
    receive first information from the first sensor that a first user is proximate to the information handling system;
    receive first logon information from the first user and first identification information associated with the first user in response to receiving the first information from the first sensor;
    authenticate the first user to use the information handling system based on the first logon information, the first identification information, and first user authentication information from the authentication database;
    launch a first operating system session for the first user in response to authenticating the first user;
    store the first identification information;
    receive second information from the first sensor that the first user is not proximate to the information handling system;
    suspend the first operating system session in response to the second information from the first sensor;
    after suspending the first operating system session, authenticate a second user to use the information handling system;
    launch a second operating system session for the second user in response to authenticating the second user;
    suspend the second operating system session;
    after suspending the second operating system session, receive third information from the first sensor that the first user is proximate to the information handling system;
    receive second identification information associated with the first user in response to the third information from the first sensor;
    determine that the first identification information matches the second identification information and first user authentication information; and
    resume the first operating system session in response to determining that the first identification information matches the second identification information and first user authentication information.

2. The information handling system of claim 1, wherein the first sensor comprises a camera device.

3. The information handling system of claim 2, wherein the first identification information and the second identification information comprise photograph information from the camera device.

4. The information handling system of claim 3, wherein in determining that the first identification information matches the second identification information and first user authentication information, the logon module is further configured to:
    perform a first facial recognition operation on the first identification information;
    perform a second facial recognition operation on the second identification information; and
    compare results from the first facial recognition operation and the second facial recognition operation to determine that the first identification information matches the second identification information.

5. The information handling system of claim 1, further comprising:
    a second sensor configured to receive the first logon information.

6. The information handling system of claim 5, wherein the second sensor comprises a secure device.

7. The information handling system of claim 6, wherein the secure device comprises at least one of a Smart Card, a Near Field Communication device, Smart Phone with an associated logon application, and a Radio Frequency Identification tag.

8. The information handling system of claim 1, wherein, in authenticating the second user, the logon module is further configured to:
    receive fourth information from the first sensor that the second user is proximate to the information handling system;
    receive second logon information from the second user and second identification information associated with the second user in response to receiving the fourth information from the first sensor;
    authenticate the second user to use the information handling system based on the second logon information and second user authentication information from the authentication database; and
    store the second identification information.

9. The information handling system of claim 1, further comprising:
    a session managed operating system;
    wherein the logon module is further configured to direct the session managed operating system to launch the first operating system session in response to authenticating the first user; and wherein in suspending the first operating system session the logon module is further configured to direct the session managed operating system to suspend the first operating system session.

10. The information handling system of claim 1, wherein the first logon information is received from the first user via a biometric sensor.

11. A shared network comprising:
a first shared system including a first sensor configured to determine that a first user is proximate to the first shared system;
a second shared system including a second sensor configured to determine that the first user is proximate to the second shared system;
a logon server configured to:
receive first information from the first sensor that the first user is proximate to the first shared system;
receive logon information from the first user and first identification information associated with the user in response to receiving the first information from the first sensor;
authenticate the user to use the first shared system based on the logon information;
launch a first operating system session for the first user on the first shared system in response to authenticating the first user;
store the first identification information;
receive second information from the first sensor that the first user is not proximate to the first shared system;
suspend the first operating system session on the first shared system in response to the second information from the first sensor, the first operating system session being associated with the first user;
after suspending the first operating system session, authenticate a second user to use the information handling system;
launch a second operating system session for the second user in response to authenticating the second user;
suspend the second operating system session;
after suspending the second operating system session, receive first information from the second sensor that the first user is proximate to the second shared system;
receive the second identification information in response to receiving the first information from the second sensor, the second identification information being associated with the first user;
determine that the first identification information matches the second identification information; and
resume the first operating system session on the second shared system in response to determining that the first identification information matches the second identification information.

12. The shared network of claim 11, wherein the first sensor of the first shared system and the first sensor of the second shared system each comprise a camera device.

13. The shared network of claim 12, wherein the first identification information and the second identification information comprise photograph information.

14. The shared network of claim 13, wherein in determining that the first identification information matches the second identification information, the logon module is further configured to:
perform a first facial recognition operation on the first identification information;
perform a second facial recognition operation on the second identification information; and
compare results from the first facial recognition operation and the second facial recognition operation to determine that the first identification information matches the second identification information.

15. The shared network of claim 11, wherein the first shared system further includes
a third sensor configured to receive the first logon information.

16. The shared network of claim 15, wherein the third sensor comprises a secure device comprising at least one of a Smart Card, a Near Field Communication device, Smart Phone with an associated logon application, and a Radio Frequency Identification tag.

17. The shared network of claim 11, wherein:
the first shared system further includes a first session managed operating system;
the second shared system further includes a second session managed operating system; and
the logon server is further configured to:
direct the first session managed operating system to launch the first operating system session in response to authenticating the first user; and
direct the first session managed operating system to suspend the first operating system session; and
direct the second session managed operating system to resume the first operating system session.

18. A method comprising:
receiving, from a first sensor of a first shared system, first information that a first user is proximate to the first shared system;
receiving, from the first shared system, logon information from the first user and first identification information associated with the user in response to receiving the first information from the first sensor;
authenticating, at a logon server, the first user to use the first shared system based on the logon information;
launching a first operating system session for the first user on the first shared system in response to authenticating the first user;
storing, at the logon server, the first identification information;
receiving second information from the first sensor that the first user is not proximate to the first shared system;
suspending the first operating system session on the first shared system in response to the second information from the first sensor, the first operating system session being associated with the first user;
in response to suspending the first operating system session, authenticating a second user to use the information handling system;
launching a second operating system session for the second user in response to authenticating the second user;
suspending the second operating system session;
in response to suspending the second operating system session, receiving, from a second sensor of a second shared system, second information that the first user is proximate to the second shared system;
receiving, from the second shared system, second identification information associated with the first user in response to receiving the second information from the second sensor;
determining, at the logon server, that the first identification information matches the second identification information; and resuming, on the second shared system, the first operating system session in response to determining that the first identification information matches the second identification information.

19. The method of claim 18, wherein:
the first sensor of the first shared system and the first sensor of the second shared system each comprise a camera device;
the first identification information and the second identification information comprise photograph information;
wherein the method further comprises:
  performing a first facial recognition operation on the first identification information;
  performing a second facial recognition operation on the second identification information; and
  comparing results from the first facial recognition operation and the second facial recognition operation to determine that the first identification information matches the second identification information.

20. The method of claim 18, wherein the first shared system further includes a third sensor configured to receive the first logon information.

\* \* \* \* \*